May 28, 1929.  P. S. SHIELD  1,714,927
TANK VALVE CONTROL SYSTEM
Original Filed Aug. 23, 1927   3 Sheets-Sheet 3
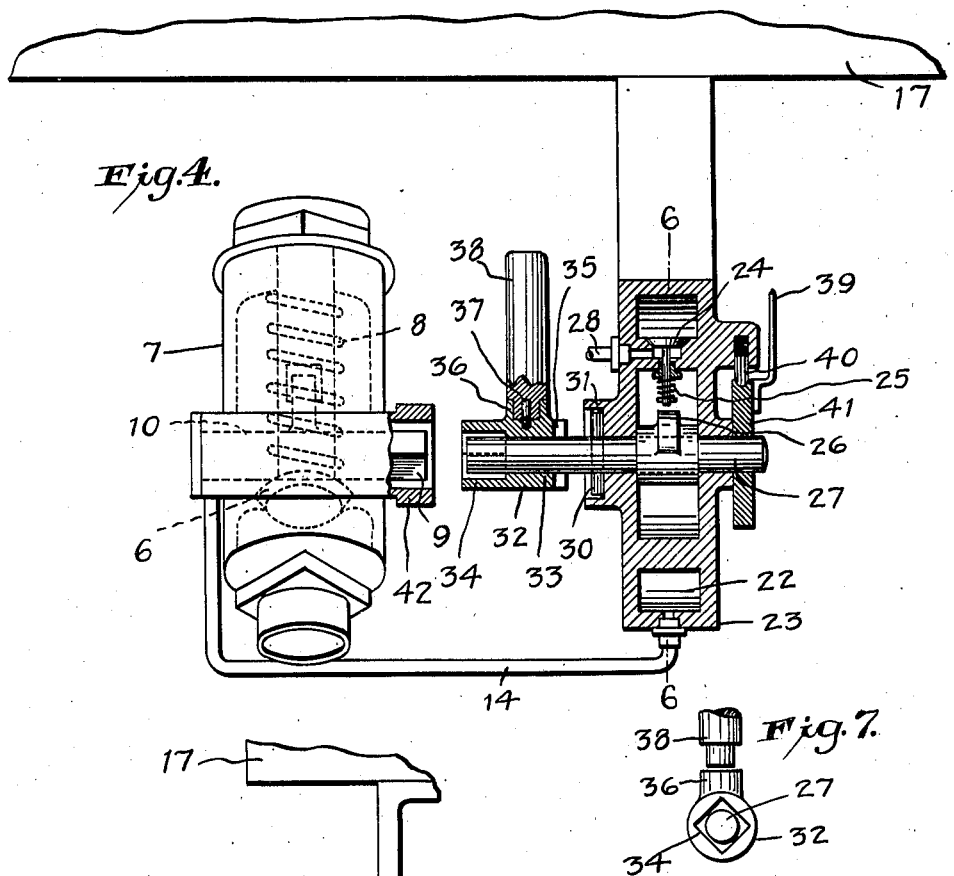
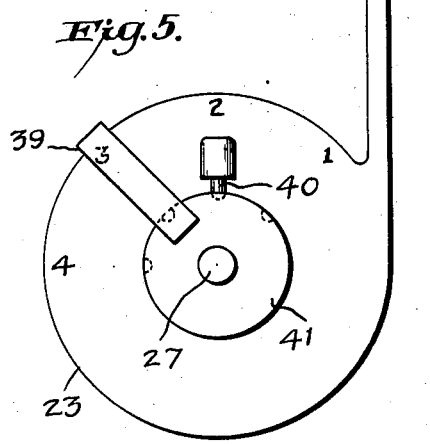
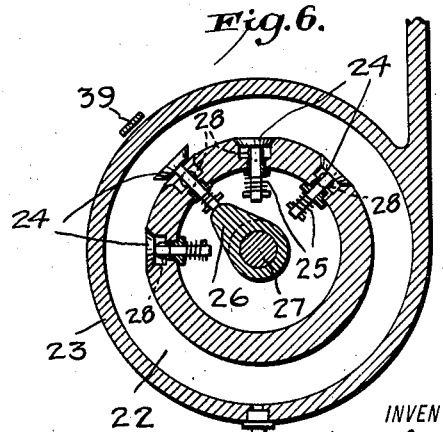

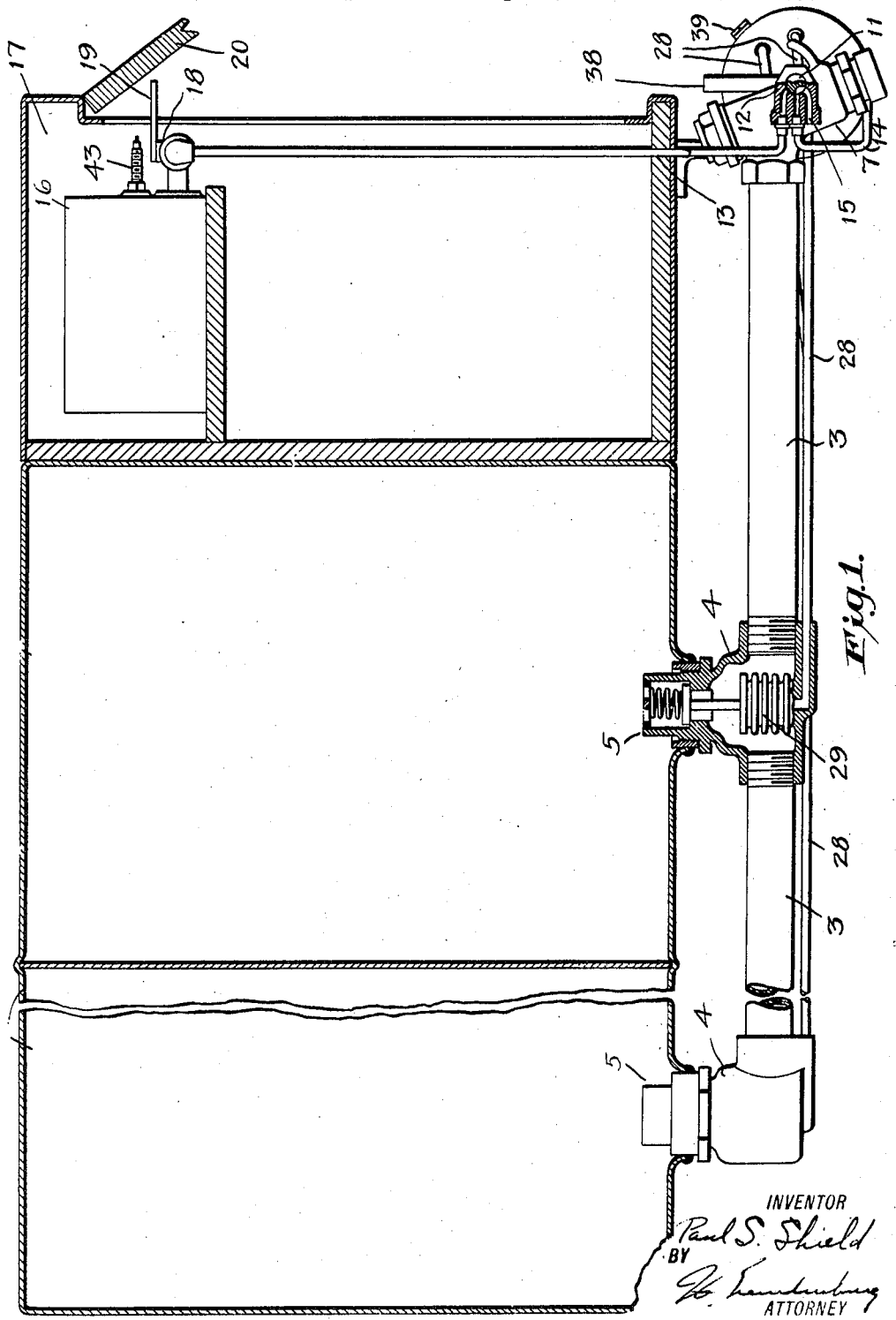

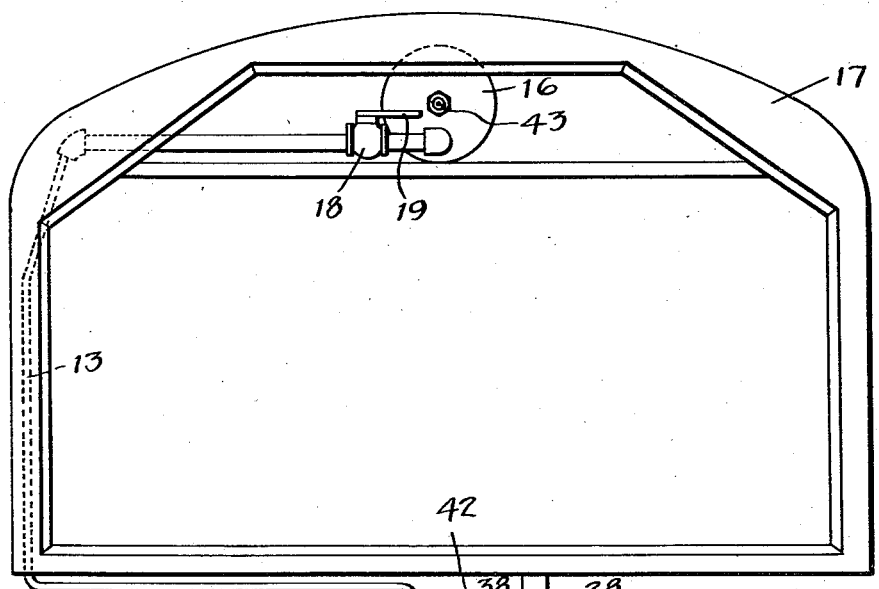
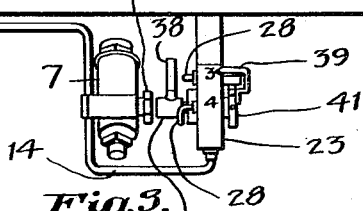
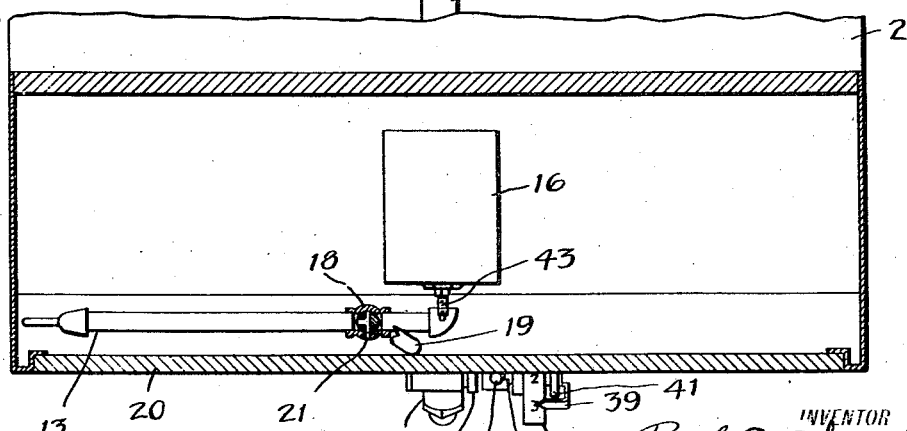

Patented May 28, 1929.

1,714,927

UNITED STATES PATENT OFFICE.

PAUL S. SHIELD, OF CINCINNATI, OHIO, ASSIGNOR TO AUGUSTINE DAVIS, JR., OF CINCINNATI, OHIO.

TANK VALVE-CONTROL SYSTEM.

Application filed August 23, 1927, Serial No. 214,866. Renewed October 10, 1928.

The invention relates to fluid-pressure systems for controlling the outlet of liquid from multiple compartment tanks, more especially truck tanks such as are used for making deliveries of gasoline. The tank to which the invention relates has a common discharge passage connected with the outlet passages from the several tank chambers or compartments; there is a valve, specifically and preferably a self-closing faucet valve for opening and closing the single discharge passage, and there are normally closed valves, which may be termed safety valves, commanding the several outlets. The purpose is to open only one of these safety valves at a time through fluid-pressure means controlled by or with the operation of the common discharge valve, and the particular object is to provide a system which is not susceptible of faulty operation by the operator in such manner as to allow operating pressure to be unintentially trapped in actuating relation to a safety valve, with the result that two or more of said valves might be open simultaneously.

The invention employs a control valve interconnected with the discharge valve, this control valve being adapted to connect the working part of the fluid-pressure system alternately with a source of pressure and with an escape. Branches of the fluid-pressure system extend to the several safety valves, or the operating devices therefor, and a distributer or a selective valve device is provided for opening said branches one at a time. An important part of the invention is an interlock or relation between the distributing means on the one hand and the interconnected discharge and control valves on the other, which enables said distributing means to be operated only when the control valve is open to the escape. Specific aspects and features of the invention will be described in connection with a preferred and simple embodiment thereof, but it is to be understood that the essentials of the invention may be embodied in apparently widely differing forms.

In the accompanying drawings forming part hereof:

Fig. 1 is a vertical longitudinal section through a vehicle tank embodying the invention, with parts in elevation, a large intermediate portion of the tank being broken out, the door of the bucket-box being broken away in a partly open position;

Fig. 2 is a rear view, with the door omitted;

Fig. 3 is a horizontal section through the upper part of Fig. 2, the door being closed and a valve being shown in section;

Fig. 4 is a view on a larger scale of the lower portion of Fig. 2, partly in section and partly in elevation;

Fig. 5 is an elevation looking at the right-hand end of Fig. 4;

Fig. 6 is a section on the line 6—6 of Fig. 4; and

Fig. 7 is a detail view of a wrench member with a portion of a removable handle separated therefrom.

The separate compartments of the tank, or the separate tank chambers, are marked 2. The tank illustrated is of the gravity type,—though the invention is not limited to that type,—in which the outlet of each compartment is through the bottom. An outlet conduit 3 extends rearwardly and is connected with the openings of the several compartments by suitable connections or passages 4. The outlets from the several compartments are commanded by self-closing valves 5, preferably placed at or in the tank compartments, at the entrances to the outlet piping. The discharge pipe, or manifold, 3 contains an opening and closing valve 6, which in the case of the gravity tank shown is the valve of a delivery faucet 7 at the end of the conduit. This valve is self-closing by means of a spring 8, and is opened by turning the polygonal end 9 of the faucet spindle 10 by means of a wrench. When the hand holding the wrench is released the faucet closes under the action of the spring, which also turns the spindle 10.

On the opposite end of the spindle there is a three-way turn-cock 11, constituting a control valve. The housing 12 of this valve contains three ports, one of which is connected with a small air pipe 13, and another with a small pipe 14, while the third, marked 15, is a vent opening. The valve member 11 is adapted to connect the pipe 14 alternately with the air pipe 13 and with the vent or escape. The relation between the control valve and the faucet valve 6 is such that when the faucet is closed the control valve closes the pipe 14 off from the air line 13 and places it in communication with the vent, while when the faucet is opened the vent is closed and the pipes 13 and 14 are in communication with each other.

The air line 13 leads from a vessel 16 of compressed air or gas mounted in a bucket-box 17 at the rear end of the truck tank, this line being preferably provided, as a precaution, with a three-way valve 18 having a handle 19, which in one position obstructs the closing of the bucket-box door 20. In this position the valve is open for passage of fluid or pressure through the line to the control valve 11, and a vent 21 is closed. When the handle 19 is moved to the position which permits closing of the door, the control valve 11 is cut off from the pressure in the vessel 16, and the portion of the line between the valves 18 and 11 is opened to the vent 21.

The pipe 14 leads to an annular chamber 22 in the body 23 of a distributer, or selective valve device. In this body there are radial poppet valves 24 held closed by the springs 25, the stems of the valves projecting inward toward the center, where they are adapted to be singly encountered and thrust outward by a cam 26 on a rotary shaft 27. When one of the valves is thus unseated, fluid under pressure may pass from the chamber 22 to one of a number of lines 28 which lead to fluid-pressure actuated devices 29 associated with the several tank outlet, or safety, valves 5, for opening the same. There are consequently as many of the valves 24 in the distributer as there are compartments to the tank.

The projecting portion of the shaft 27 is round, but contiguous the body 23 there is an engagement part, preferably in the form of a transverse pin 30 fixed in the shaft and projecting at both ends therefrom. This engagement part is housed within an encircling guard 31.

The distributer 23 and the faucet 7 are mounted adjacent each other, with the projecting portions of the shaft 27 and the spindle 10 in axial opposition to each other. A wrench hub 32 is formed with an internal opening, one portion 33 which is round to slide on the shaft 27, while the other portion 34 is polygonal to fit the polygonal end 9 of the faucet spindle. One end of the hub likewise contains a transverse slot 35, forming means for engagement with the pin 30.

The hub 32 has a lateral socket 36 and standing in it and of substantially even height therewith, a pin 37. A removable handle 38 is specially formed at one end to fit within the socket and about the pin, so that in the absence of this handle it is practically impossible to open the faucet 7.

A suitable index 39 is provided in connection with the distributer or selector so that the operator can tell which compartment of the tank he is going to open. The shaft 27 and cam 26 are held non-positively in the several positions corresponding to the opening of one or another of the valves 24 by a spring-pressed plunger 40 cooperative with a series of notches in a disc 41 on the shaft.

In operation, the handle 38 is applied to the wrench hub 32. The hub is slid inward on the shaft 27 so as to enter its slotted end within the guard 31 into engagement with the pin 30. The wrench is now turned to the proper position for making a delivery from the tank compartment desired. This opens and holds open one of the valves 24, preparing a path for the application of fluid pressure to the operating device 29 of the outlet valve 5 of that compartment.

The wrench is then slid outward along the shaft 27 so as to enter the other end of the hub 32 within the customary guard 42 on the faucet body surrounding the projecting end 9 of the spindle 10. The square recess in the hub is thus pushed over the square end of the spindle, and on now turning the wrench the faucet will be opened. Also the control valve 11 will be turned to the position which closes the vent 15 and opens the path for fluid pressure from the line 13 to the line 14, and thence by way of the chamber 22 of the distributer and past the valve 24 which had previously been opened, to the line 28 leading to the device 29 of the outlet valve 5 which is to be opened. Assuming the valve 18 to have been opened, the pressure therefore opens this valve 5, and liquid will flow from the selected tank compartment through the corresponding outlet 4 and the discharge or manifold pipe 3, past the open valve 6 of the faucet.

Because of the interlock or interrelation between the delivery valve 6 and the control valve 11 on the one hand and the distributer or selector 23 on the other hand, or the operating means therefor, the operator can not, or at least will not, operate the selector or distributer while the control valve 11 is open. If, for example, it were possible for the operator to make the mistake of first opening the faucet (thereby opening the control valve) and while holding the faucet open then turn the distributer to select the desired compartment, the fluid pressure then turned on to the chamber 22 would be admitted successively to the lines 28 as the cam 26 in its turning unseated one valve 24 after another. This would open one outlet valve 5 after another, and as each valve 24 was closed the pressure would be trapped in the devices 29 so that the valves 5 would remain open. Liquid would therefore be drawn from a number of compartments at the same time instead of from the one intended. This particular difficulty could be avoided, with additional complication by employing a selector which would be truly selective, in place of the simple distributer 23, and such an expedient is not excluded.

Even were the selector truly selective, however, it might still be possible for the operator to operate the selector so as to select a different tank compartment while the control valve 11 was open. In that event, operating pressure would be trapped in the device 29 of the valve 5 of the compartment previously selected, with the result that this valve would continue to be held open after the other valve 5 was opened.

The present invention obviates these difficulties. When the wrench is not in engagement with the polygonal end 9 of the faucet spindle 10, the spring 8 immediately closes the control valve 11, as well as closing the faucet valve 6, and the operating wrench must be shifted out of operating relation to the faucet in order to operate the selector or distributer. An essential feature of the invention is therefore a relation which permits the operating means to operate the selector or distributer only when the control valve is closed.

The fluid-pressure medium is preferably air or gas, and the vessel 16 is shown provided with a tire valve connection 43 adapted to receive an air hose, so that the vessel may be charged from time to time at a filling station, or by means of a suitable pump carried on the vehicle. The invention is equally applicable to a system employing an incompressible medium. In that event the vent 21 would be omitted, and the vent 15 instead of being a vent to atmosphere would be a return escape for the medium.

I claim:

1. In a multiple compartment tank, having outlet passages from the several compartments joining with a common discharge passage, normally closed valves for the several outlets, and an opening and closing valve in said common discharge passage, a fluid-pressure system for operating said outlet valves, said system including branches leading to the several outlet valves, a control valve adapted to connect the working part of the system alternately with a source of pressure and with an escape, said control valve and said discharge passage valve being interconnected so as to be operated simultaneously, means for placing said branches one at a time in communication with said control valve, and an interlock enabling said means to be operated only when said control valve is open to the escape.

2. In a multiple compartment tank, having outlet passages from the several compartments joining with a common discharge passage, normally closed valves for the several outlets, and an opening and closing valve in said common discharge passage, a fluid-pressure system for operating said outlet valves, said system including branches leading to the several outlet valves, a control valve adapted to connect the working part of the system alternately with a source of pressure and with an escape, said control valve and said discharge passage valve being interconnected so as to be operated simultaneously, a distributer for placing said branches one at a time in communication with said control valve, said distributer and said discharge passage valve having rotary engagement parts in axial opposition to each other, and an operating member shiftably mounted between said engagement parts so as to be engageable with one or the other thereof.

3. In a multiple compartment tank, having outlet passages from the several compartments joining with a common discharge passage, normally closed valves for the several outlets, and an opening and closing valve in said common discharge passage, a fluid-pressure system for operating said outlet valves, said system including branches leading to the several outlet valves, a control valve adapted to connect the working part of the system alternately with a source of pressure and with an escape, said control valve and said discharge passage valve being interconnected so as to be operated simultaneously, a distributer for placing said branches one at a time in communication with said control valve, said distributer and said discharge passage valve having rotary engagement parts in axial opposition to each other, and an operating hub shiftably mounted between said engagement parts so as to be engagable with one or the other thereof, said hub having means for the reception of a removable handle.

4. In a multiple compartment tank, having outlet passages from the several compartments joining with a common discharge passage, normally closed valves for the several outlets, and an opening and closing valve in said common discharge passage, a fluid-pressure system for operating said outlet valves, said system including branches leading to the several outlet valves, a control valve adapted to connect the working part of the system alternately with a source of pressure and with an escape, said control valve and said discharge passage valve being interconnected so as to be operated simultaneously, a distributer for placing said branches one at a time in communication with said control valve, said distributer having a round shaft with an engagement part at the inner portion thereof, said discharge passage valve having a polygonal spindle, said stem and spindle being opposed to each other, and an operating member having an opening comprising a round portion slidable on said shaft and a polygonal portion for engagement with said spindle, said member having means at one end for engagement with said engagement part.

PAUL S. SHIELD.